United States Patent
Yu (10) Patent No.: US 8,929,605 B2
(45) Date of Patent: Jan. 6, 2015

(54) IMAGE PROCESSING METHOD AND IMAGE PROCESSING APPARATUS FOR GENERATING VEHICULAR IMAGE

(71) Applicant: Avisonic Technology Corporation, Hsin-Chu (TW)

(72) Inventor: Chi-Chang Yu, Keelung (TW)

(73) Assignee: Avisonic Technology Corporation, Science-Based Industrial Park, Hsin-Chu (TW)

( * ) Notice: Subject to any disclaimer, the term of this patent is extended or adjusted under 35 U.S.C. 154(b) by 58 days.

(21) Appl. No.: 13/900,553

(22) Filed: May 23, 2013

(65) Prior Publication Data

US 2014/0126778 A1 May 8, 2014

(30) Foreign Application Priority Data

Nov. 2, 2012 (TW) .............................. 101140802 A (51) Int. Cl.
*G06K 9/00* (2006.01)
*G06T 3/40* (2006.01)

(52) U.S. Cl.
CPC .................................. *G06T 3/4038* (2013.01)
USPC .......................................... 382/104; 382/103

(58) Field of Classification Search
None
See application file for complete search history.

(56) References Cited

U.S. PATENT DOCUMENTS

| 5,283,634 A | 2/1994 | Yamazaki | |
|---|---|---|---|
| 8,494,286 B2* | 7/2013 | Capata et al. | 382/218 |
| 8,811,770 B2* | 8/2014 | Sumi | 382/284 |
| 2003/0174253 A1* | 9/2003 | Ito et al. | 348/699 |
| 2006/0078224 A1* | 4/2006 | Hirosawa | 382/284 |
| 2011/0116682 A1* | 5/2011 | Wang et al. | 382/103 |
| 2011/0234801 A1* | 9/2011 | Yamada et al. | 348/148 |
| 2011/0311101 A1* | 12/2011 | Rafii et al. | 382/103 |
| 2013/0129144 A1* | 5/2013 | Chang et al. | 382/103 |
| 2013/0169811 A1* | 7/2013 | Smitherman | 348/148 |
| 2014/0118487 A1* | 5/2014 | Shikata | 348/36 |

FOREIGN PATENT DOCUMENTS

| JP | H04266178 A | 9/1992 |
|---|---|---|
| JP | H1175054 A | 3/1999 |
| JP | WO0064175 A1 | 10/2000 |
| KR | 1020100081964 A | 7/2010 |

* cited by examiner

*Primary Examiner* — Shervin Nakhjavan
(74) *Attorney, Agent, or Firm* — Winston Hsu; Scott Margo (57) ABSTRACT

An image processing method for generating a vehicular image includes the following steps: providing a first image, wherein the first image has a first specific region, and pixel data of each pixel in the first specific region is converted to a predetermined value; providing a second image, and overlapping the first image and the second image to form an overlapping region; comparing the predetermined value with pixel data of each pixel in the first image overlapped on the second image to generate a comparison result; and determining whether pixel data of each pixel in the overlapping region is pixel data of the first image or pixel data of the second image according to the comparison result, and accordingly generating the vehicular image.

12 Claims, 7 Drawing Sheets

IMAGE PROCESSING METHOD AND IMAGE PROCESSING APPARATUS FOR GENERATING VEHICULAR IMAGE

BACKGROUND OF THE INVENTION

1. Field of the Invention

The disclosed embodiments of the present invention relate to image processing, and more particularly, to an image processing method for generating a vehicular image without background scenes by pre-processing images according to pixel data, and a related image processing apparatus.

2. Description of the Prior Art

An around view monitor system (AVMS) provides an around view monitor (AVM) image/bird's-eye view image around a vehicle, which enables the driver to monitor the surrounding conditions of the vehicle in real time. Conventionally, a vehicle image may be attached to the AVM image generated by the AVMS in order to form a completed vehicular image, which may help the driver control the relationship between the vehicle (corresponding to the vehicle image) and the surroundings (corresponding to the AVM image). The vehicle image attached to the bird's-eye view image may also include a background scene (e.g. a white or black background) which is unrelated to the vehicle; this not only decreases image fidelity but also adds unnecessary image contents between the vehicle and the surroundings.

Thus, an image processing method is needed to remove the background scene between the vehicle and the surroundings in the vehicular image in order to provide a vehicular image of better image quality.

SUMMARY OF THE INVENTION

It is therefore an objective of the present invention to provide an image processing method for generating a vehicular image without background scenes by pre-processing images according to pixel data, and a related image processing apparatus to solve the above problems.

According to an embodiment of the present invention, an exemplary image processing method for generating a vehicular image is disclosed. The exemplary image processing method comprises the following steps: providing a first image, wherein the first image has a first specific region, and pixel data of each pixel in the first specific region is converted to a predetermined value; providing a second image, and overlapping the first image and the second image to form an overlapping region; comparing the predetermined value with pixel data of each pixel in the first image overlapped on the second image to generate a comparison result; and determining whether pixel data of each pixel in the overlapping region is pixel data of the first image or pixel data of the second image according to the comparison result, and accordingly generating the vehicular image.

According to an embodiment of the present invention, an exemplary image processing apparatus for generating a vehicular image is disclosed. The image processing apparatus comprises a storage unit and a processing unit. The storage unit is arranged for storing a first image and a second image, wherein the first image has a first specific region, and pixel data of each pixel in the first specific region is converted to a predetermined value. The processing unit is coupled to the storage unit, and is arranged for overlapping the first image and the second image to form an overlapping region; comparing the predetermined value with pixel data of each pixel in the first image overlapped on the second image to generate a comparison result; and determining whether pixel data of each pixel in the overlapping region is pixel data of the first image or pixel data of the second image according to the comparison result, and accordingly generating the vehicular image.

The present invention provides an image processing method which can generate a vehicular image without background scenes between a vehicle object and the surroundings by pre-processing a vehicle image. The proposed method may beautify the vehicular image and enhance image fidelity thereof, thereby providing a wider driver's field of view and more completed driving information for the driver.

These and other objectives of the present invention will no doubt become obvious to those of ordinary skill in the art after reading the following detailed description of the preferred embodiment that is illustrated in the various figures and drawings.

DETAILED DESCRIPTION

The concept of the present invention is that when an image is overlapped with another image to generate a synthesis image, the image is pre-processed to mark a specific region therein, thus facilitating reserving of pixel data for an image overlapping region between the above two images, wherein pixel data belonging to the specific region will not be included in the synthesis image, and the image overlapping region includes at least a portion of the specific region. In other words, the objective of removing the pixel data of the specific region is achieved. For example, in a case where one of a first image and a second image is attached to the other of the first image and the second image to generate a vehicular image, as an image region of the vehicular image may be located in an image overlapping region and correspond to pixel data of the first image as well as that of the second image, the concept of the present invention may be employed to select required pixel data as pixel data of the image region according to actual requirements/considerations; i.e. unnecessary pixel data is removed.

It should be noted that a size of the image overlapping region between the two attached images may be equal to an image size of one of the two images or smaller than respective image sizes of the two images. Additionally, the concept of the present invention may also be employed to generate a synthesis image by attaching more than two images. For brevity and clarity, the following description uses a two-image attachment to illustrate one exemplary vehicular image generation. A person skilled in the field of image processing should understand that the concept of the present invention is not limited to vehicular image applications.

Figure 1:
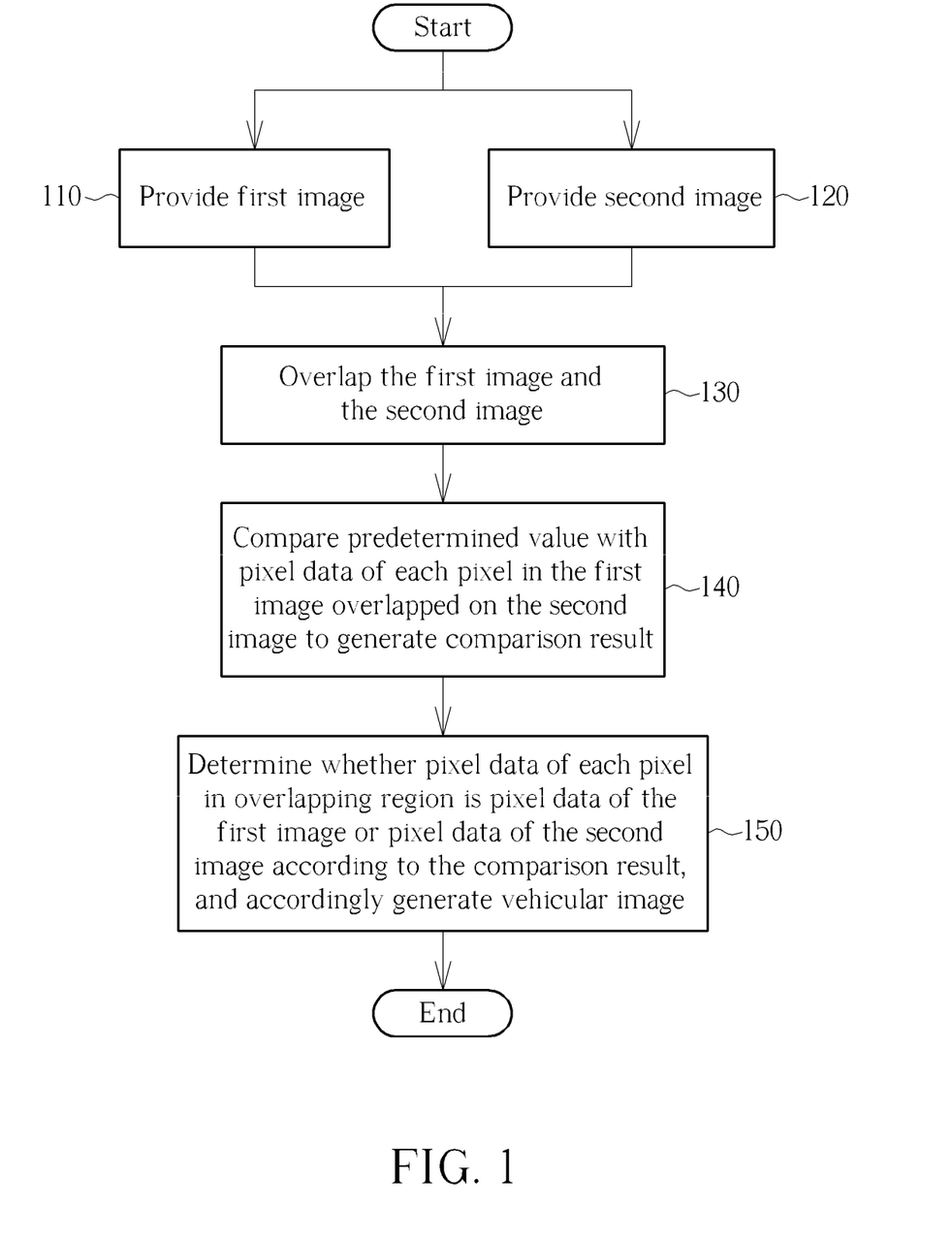
FIG. 1 is a flowchart of an exemplary generalized image processing method for generating a vehicular image according to an embodiment of the present invention.

Please refer to FIG. 1, which is a flowchart of an exemplary generalized image processing method for generating a vehicular image according to an embodiment of the present invention. First, in steps 110 and 120, the flow provides a first image (e.g. a vehicle image) and a second image (e.g. an AVM image), respectively, wherein the first image has a first specific region, pixel data of each pixel in the first specific region is converted to a predetermined value (e.g. a predetermined luminance value or other values related to pixels), and the second image is synthesized by a plurality of sub-images. For example, the sub-images may be a plurality of corrected images, which are generated by performing a geometric correction upon a plurality of fisheye images. Next, the flow overlaps the first image and the second image (in step 130), and performs pixel data processing upon an overlapping region between the first image and the second image to generate the vehicular image, wherein the pixel data of the overlapping region is not derived from the predetermined value of the first specific region (in steps 140 and 150).

More specifically, the flow may compare the predetermined value with pixel data of each pixel in the first image overlapped on the second image to generate a comparison result (in step 140). Next, the flow may determine whether pixel data of each pixel in the overlapping region is pixel data of the first image or pixel data of the second image according to the comparison result, and accordingly generate the vehicular image (in step 150). In a case where the size of the first image is equal to that of the second image, the flow may generate the whole vehicular image according to the pixel data of each pixel in the overlapping region; in a case where the size of the first image is smaller than that of the second image, the flow may generate a portion of the vehicular image located in the overlapping region according to the pixel data of each pixel in the overlapping region. Please note that if the results are substantially the same, steps may not be executed in the exact order shown in FIG. 1. For example, the step of providing the first image may be executed before or after the step of providing the second image. Further description is detailed as follows.

Figure 2:
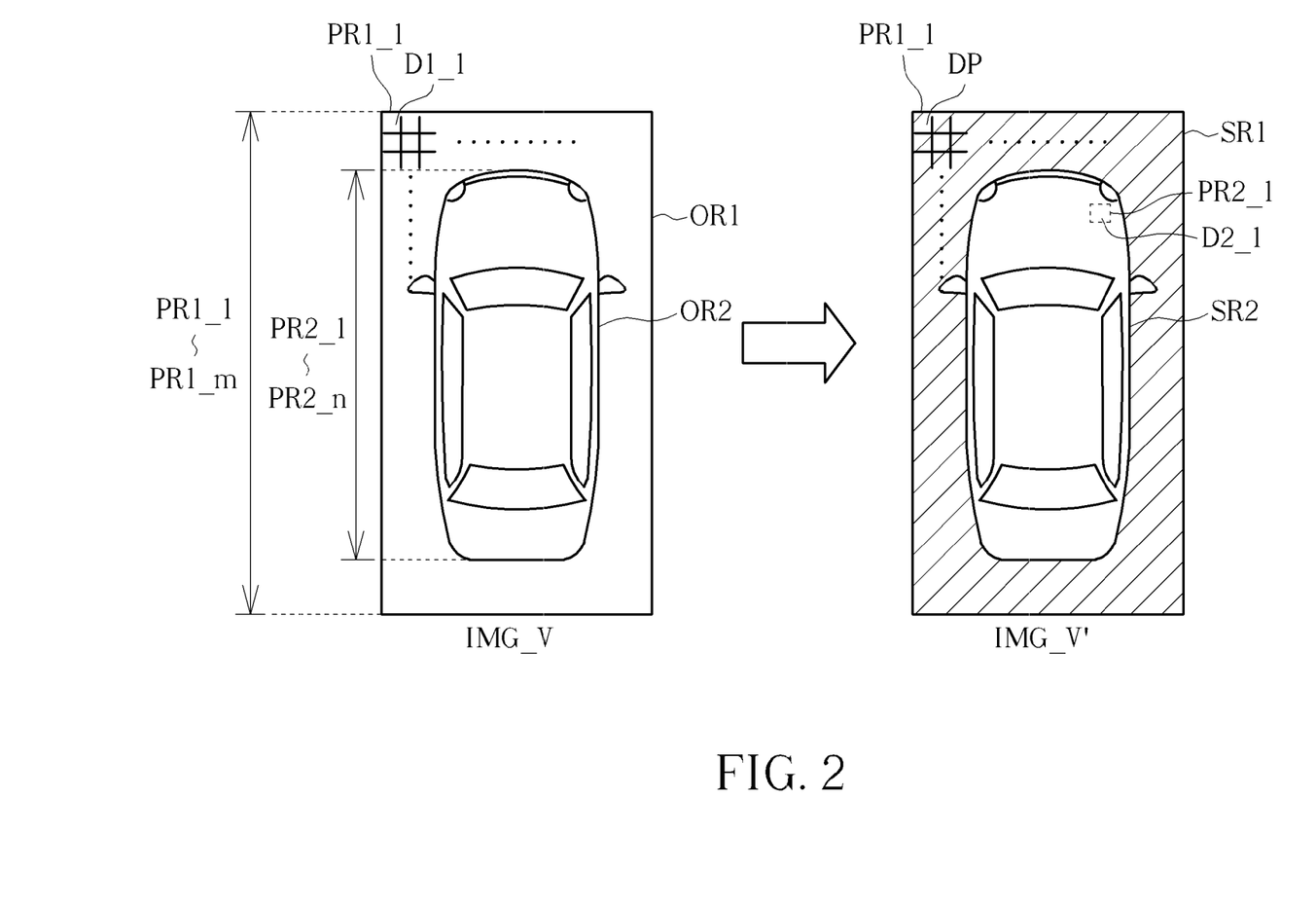
FIG. 2 is a diagram illustrating an exemplary pre-processing performed on an object image to provide a vehicle image as the aforementioned first image according to an embodiment of the present invention.

Please refer to FIG. 2, which is a diagram illustrating an exemplary pre-processing performed upon an object image IMG_V to provide a vehicle image IMG_V' as the aforementioned first image according to an embodiment of the present invention. As shown in FIG. 2, the object image IMG_V includes a first object region OR1 and a second object region OR2, wherein the first object region OR1 is a background scene (e.g. a white or black background) and the second object region OR2 is a foreground object (e.g. a vehicle object). In addition, the first object region OR1 includes a plurality of pixels $PR1\_1$-$PR1\_m$, and the second object region OR2 includes a plurality of pixels $PR2\_1$-$PR2\_n$.

In this embodiment, each pixel data of the first object region OR1 of the object image IMG_V (e.g. pixel data $D1\_1$ of the pixel $PR1\_1$) may be replaced by a predetermined value DP to generate the vehicle image IMG_V' (i.e. the aforementioned first image), wherein the vehicle image IMG_V' includes a first specific region SR1 and a second specific region SR2. As shown in FIG. 2, the object image IMG_V may be regarded as a vehicle image before the pre-processing, and the vehicle image IMG_V' may be regarded as a vehicle image after the pre-processing. That is, the first object region OR1 of the object image IMG_V corresponds to the first specific region SR1 of the vehicle image IMG_V', and the second object region OR2 of the object image IMG_V corresponds to the second specific region SR2 of the vehicle image IMG_V'. As a result, pixel data of each pixel in the first specific region SR1 of the vehicle image IMG_V' is equal to the predetermined value DP (e.g. pixel data DP of the pixel $PR1\_1$). It should be noted that as the pixels $PR1\_1$-$PR1\_m$ may include pixel(s) having the predetermined value DP before the object image IMG_V is pre-processed, only pixel data of the first object region OR1 which are different from the predetermined value DP may need to be modified to the predetermined value DP, rather than each pixel data.

In this embodiment, regarding at least one pixel having the predetermined value DP in the second specific region SR2 of the vehicle image IMG_V' (e.g. the pixel $PR2\_1$), pixel data thereof may be modified to pixel data different from the predetermined value DP (e.g. pixel data $D2\_1$). In one preferred embodiment, each pixel data in the second specific region SR2 of the vehicle image IMG_V' is different from the predetermined value DP. That is, in addition to replacing the pixel data of each pixel in the first object region OR1 of the object image IMG_V by the predetermined value DP, at least one pixel data (equal to the predetermined value DP) of the second object region OR2 of the object image IMG_V may be modified to be pixel data different from the predetermined value DP in order to generate the vehicle image IMG_V'. After the aforementioned modification and replacement of pixel data, the first specific region SR1 (i.e. the background scene) of the vehicle image IMG_V' is labeled with the predetermined value DP (shown by slanting lines). In practice, the aforementioned pixel data may be a pixel setting value (e.g. a luminance/luma value or a chrominance/chroma value) of a color space (e.g. an RGB space or a YUV space). In one implementation where the aforementioned pixel data is a luminance value, and a luminance value of 255 is selected as the predetermined value DP, each luminance value of the first specific region SR1 of the pre-processed vehicle image IMG_V' is equal to 255, and each luminance value of the second specific region SR2 of the pre-processed vehicle image IMG_V' after pre-processing is different from 255.

Figure 3:
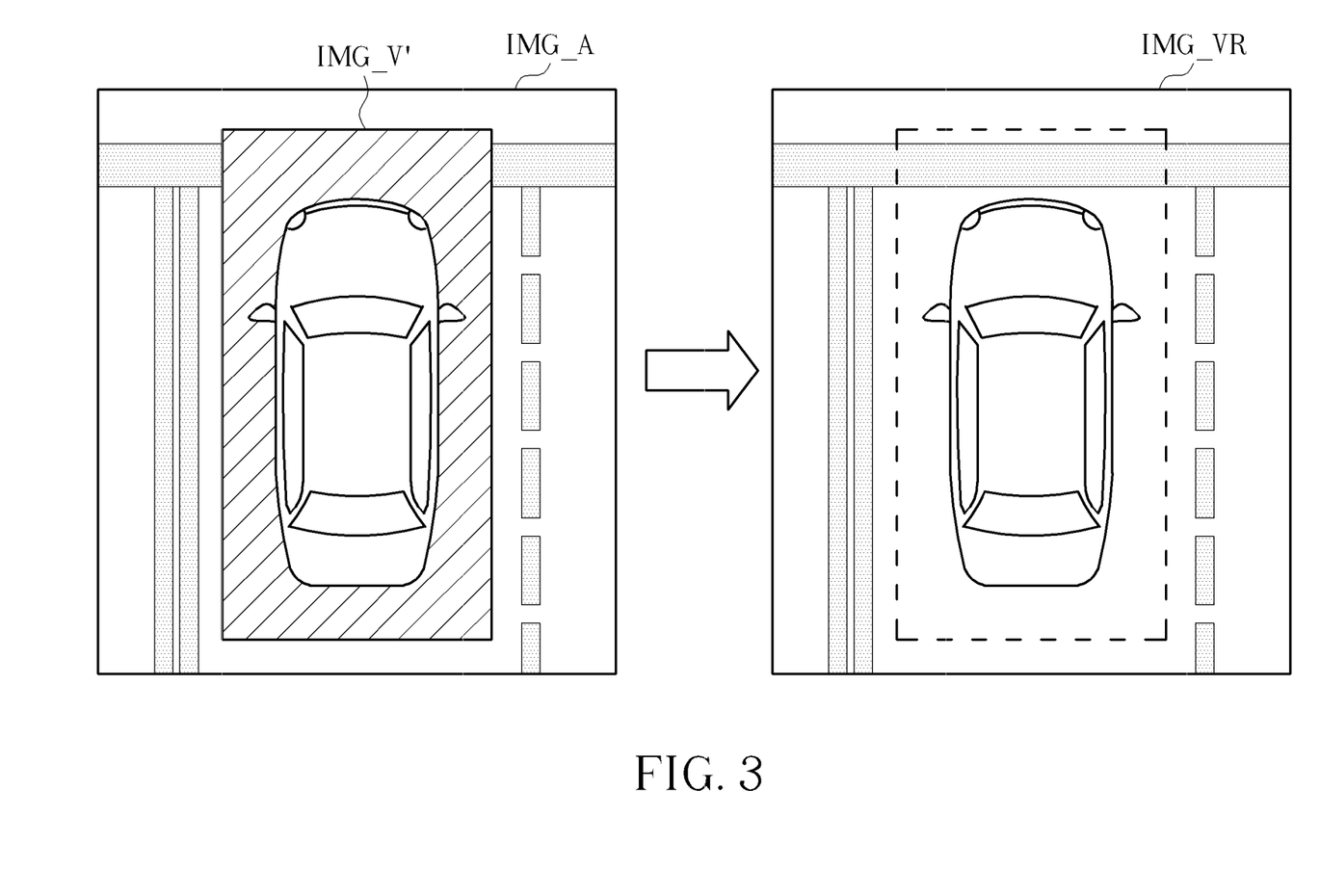
FIG. 3 is a diagram illustrating an exemplary vehicular image generated by synthesizing the vehicle image shown in FIG. 2 and an AVM image according to an embodiment of the present invention.

Please refer to FIG. 3, which is a diagram illustrating an exemplary vehicular image IMG_VR generated by synthesizing the vehicle image IMG_V' shown in FIG. 2 and an AVM image IMG_A according to an embodiment of the present invention. As shown in FIG. 3, the vehicle image IMG_V' will be attached to the AVM image IMG_A. In this embodiment, as a size of the AVM image IMG_A is larger than the vehicle image IMG_V', an overlapping region between the vehicle image IMG_V' and the AVM image IMG_A is the vehicle image IMG_V'. In order to display only the vehicle object of the vehicle image IMG_V' on the vehicular image IMG_VR, pixel data of the AVM image IMG_A may be provided for pixels corresponding to the background scene of the vehicle image IMG_V', thereby achieving the objective of eliminating the background scene of the vehicle image IMG_V'.

More specifically, in the overlapping region, the predetermined value DP may be compared with pixel data of each pixel in the vehicle image IMG_V' to generate a comparison result. When the comparison result indicates that pixel data of a pixel in the vehicle image IMG_V' is equal to the predetermined value DP, pixel data of a corresponding pixel (at the same position as the pixel in the vehicle image IMG_V') in the AVM image IMG_A may be selected as pixel data of a corresponding pixel (at the same position as the pixel in the vehicle image IMG_V') in the vehicular image IMG_VR; when the comparison result indicates that the pixel data of the pixel in the vehicle image IMG_V' is different from the predetermined value DP, the pixel data of the pixel in the vehicle image IMG_V' may be selected as the pixel data of the corresponding pixel in the vehicular image IMG_VR. In other words, the background scene around the vehicle object of the vehicular image IMG_VR may be replaced by the AVM image IMG_A. The resultant effect is that the background scene around the vehicle object is changed to a transparent background, or the background scene around the vehicle object is removed visually. Additionally, regarding each pixel in a non-overlapping region between the vehicle image IMG_V' and the AVM image IMG_A, pixel data of a pixel (corresponding to the non-overlapping region) in the AVM image IMG_A may be selected as pixel data of a corresponding pixel (at the same position as the pixel in the AVM image IMG_A) in the vehicular image IMG_VR, thereby generating the whole vehicular image IMG_VR.

Figure 4:
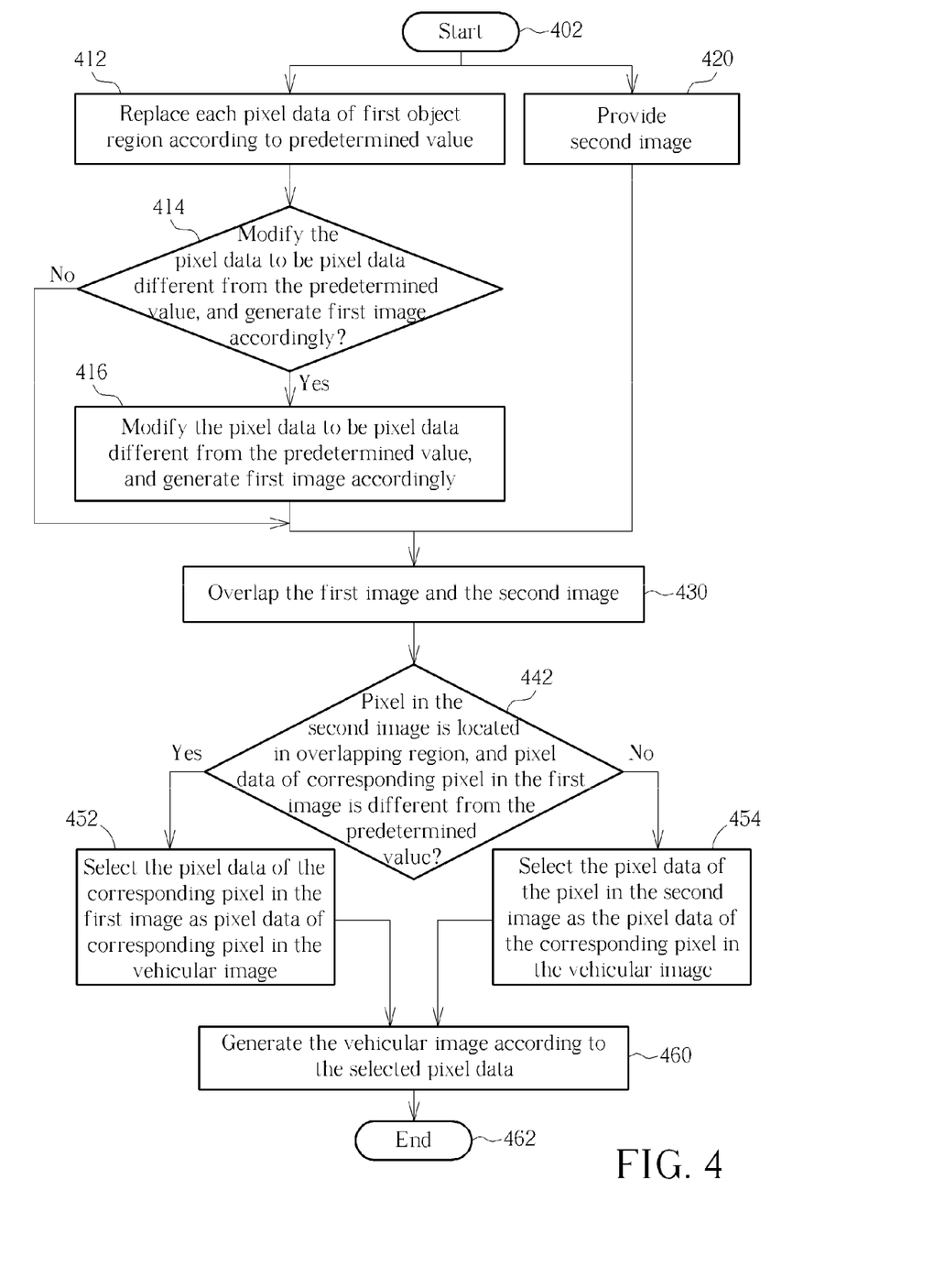
FIG. 4 is a flowchart of an exemplary image processing method for generating a vehicular image according to an embodiment of the present invention.

Please refer to FIG. 4, which is a flowchart of an exemplary image processing method for generating a vehicular image according to an embodiment of the present invention. Provided that the result is substantially the same, steps may be executed in the exact order shown in FIG. 4. The image processing method shown in FIG. 4 may be summarized as below.

Step 402: Start.

Step 412: Replace each pixel data in a first object region of an object image according to a predetermined value.

Step 414: Compare pixel data of each pixel in a second object region of the object image with the predetermined value. If at least one pixel data is equal to the predetermined value, go to step 416; otherwise, go to step 430.

Step 416: Modify the pixel data of the second object region which is equal to the predetermined value to be pixel data different from the predetermined value DP, and generate a first image accordingly.

Step 420: Provide a second image.

Step 430: Overlap the first image and the second image.

Step 442: Determine whether each pixel in the second image is located in an overlapping region between the first image and the second image. If the pixel in the second image is located in the overlapping region, determine whether pixel data of a corresponding pixel (at the same position as the pixel in the second image) in the first image is different from the predetermined value. If the pixel in the second image is located in the overlapping region, and the pixel data of the corresponding pixel in the first image is different from the predetermined value, go to step 452; if the pixel of the second image is not located in the overlapping region, or the pixel of the second image is located in the overlapping region while the pixel data of the corresponding pixel in the first image is equal to the predetermined value, go to step 454.

Step 452: Select the pixel data of the corresponding pixel (at the same position as the pixel in the second image) in the first image as pixel data of a corresponding pixel (at the same position as the pixel in the second image) in the vehicular image.

Step 454: Select the pixel data of the pixel in the second image as pixel data of the corresponding pixel (at the same position as the pixel in the second image) in the vehicular image.

Step 460: Generate the vehicular image according to the selected pixel data.

Step 462: End.

In one implementation, the steps 414 and 416 (i.e. the steps of comparing and modifying each pixel data of the second object region) may be executed before the step 412 (i.e. the step of replacing each pixel data of the first object region). In another implementation, step 412 also can go parallel with step 414 and step 416. As a person skilled in the art can readily understand the operation of each step shown in FIG. 4, further description is omitted here for brevity.

Each of the flowcharts shown in FIG. 1 and FIG. 4 may include a step of performing a geometric transformation upon an image. For example, before generating the vehicular image IMG_VR shown in FIG. 3, the flow may perform a zoom in operation, a zoom out operation, a rotation operation, a shifting operation, a tilt operation and/or a viewing angle changing operation upon the object image IMG_V/the vehicle image IMG_V' shown in FIG. 2 and the AVM image IMG_A shown in FIG. 3. Please refer to FIG. 5, which is a diagram illustrating an exemplary vehicular image generation according to an embodiment of the present invention. The difference between the vehicular image IMG_VR1 shown in FIG. 5 and the vehicular image IMG_VR shown in FIG. 3 is that the vehicular image IMG_VR1 is processed by an image rotation operation. In this embodiment, the vehicle image IMG_V1' is generated by rotating the vehicle image IMG_V' shown in FIG. 2 to a specific angle. In addition, a plurality of sub-images synthesized to generate the AVM image IMG_A shown in FIG. 3 (e.g. a plurality of corrected images generated by performing a geometric correction upon a plurality of fisheye images) may be rotated to the specific angle to generate a plurality of transformed images. Next, the transformed images may be synthesized to generate the AVM image IMG_A1. Finally, the vehicular image IMG_VR1 may be generated by executing the steps 130-150 shown in FIG. 1 or the steps 430-460 shown in FIG. 4. In brief, pixel data of an image may be adjusted first, and then an adjusted image may be processed by a geometric transformation. A plurality of sub-images may be processed by a geometric transformation first, and then synthesized to generate a synthesis image.

It should be noted that the aforementioned geometric transformation may be a two-dimensional (2D) transformation, a three-dimensional (3D) transformation or a combination of the 2D transformation and the 3D transformation. Please refer to FIG. 6, which is a diagram illustrating an exemplary vehicular image generation according to another embodiment of the present invention. The difference between the vehicular image IMG_VR2 shown in FIG. 6 and the vehicular image IMG_VR shown in FIG. 3 is that the vehicular image IMG_VR2 is processed by a viewing angle changing operation (i.e. a top-view transformation). In this embodiment, the vehicle image IMG_V2' may be generated by performing the viewing angle changing operation directly upon the vehicle image IMG_V' shown in FIG. 2. In addition, a plurality of corrected images used to generate the AVM image IMG_A shown in FIG. 3 (e.g. a plurality of bird's-eye view images) may be processed by the viewing angle changing operation to generate a plurality of changed viewing angle images, and the changed viewing angle images may be synthesized to generate the AVM image IMG_A2. In this embodiment, as source images of the AVM image IMG_A2 (i.e. the corrected images of the AVM image IMG_A shown in FIG. 3) are processed by the viewing angle changing operation before the image synthesis, image data for displaying the AVM image IMG_A2 will not be insufficient. In other words, a pedestrian and a crosswalk can be seen in the AVM image IMG_A2.

Figure 5:
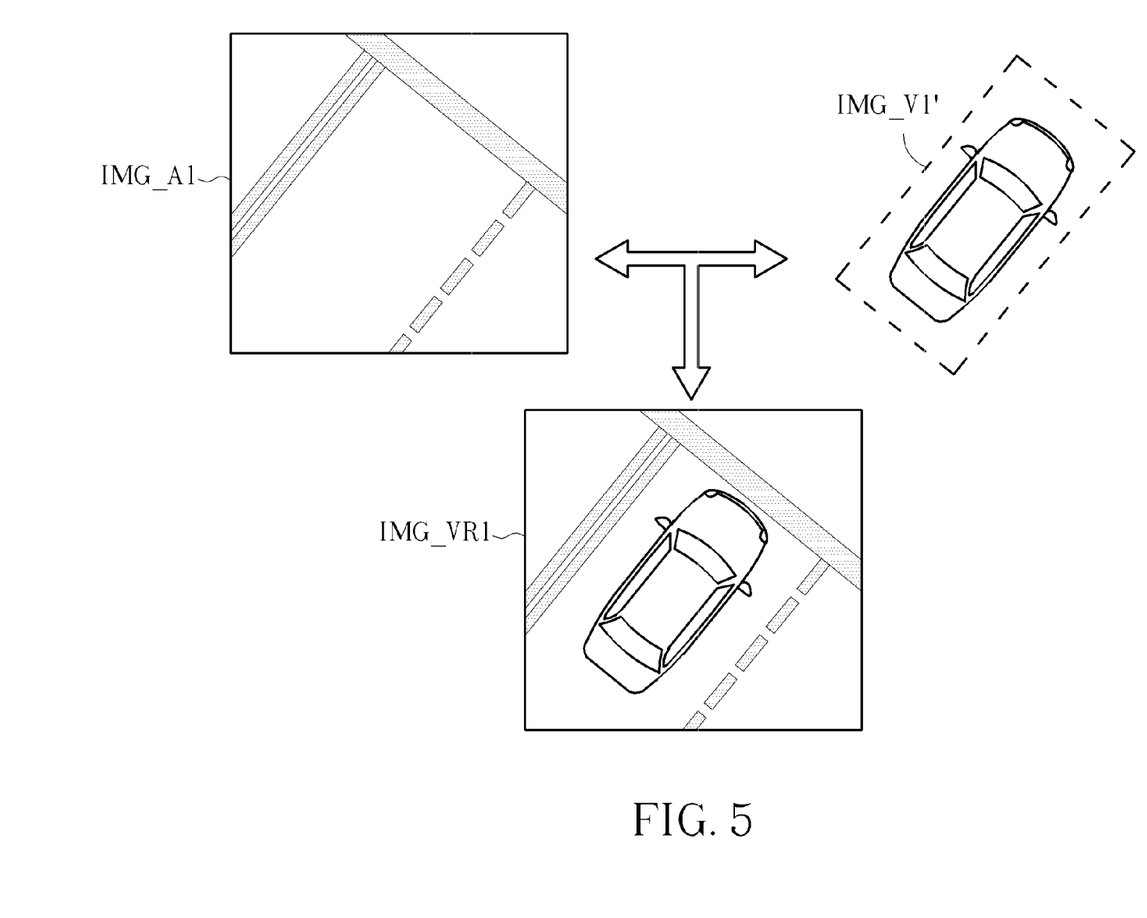
FIG. 5 is a diagram illustrating an exemplary vehicular image generation according to an embodiment of the present invention.
Figure 6:
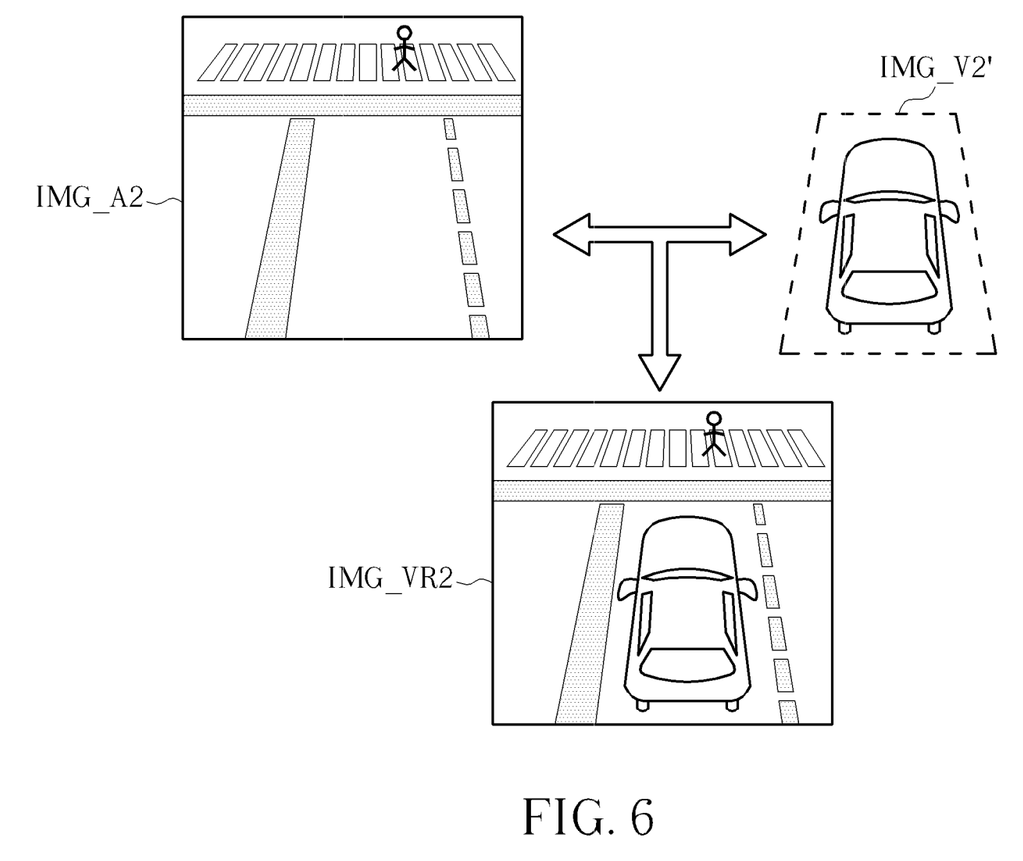
FIG. 6 is a diagram illustrating an exemplary vehicular image generation according to another embodiment of the present invention.
Figure 7:
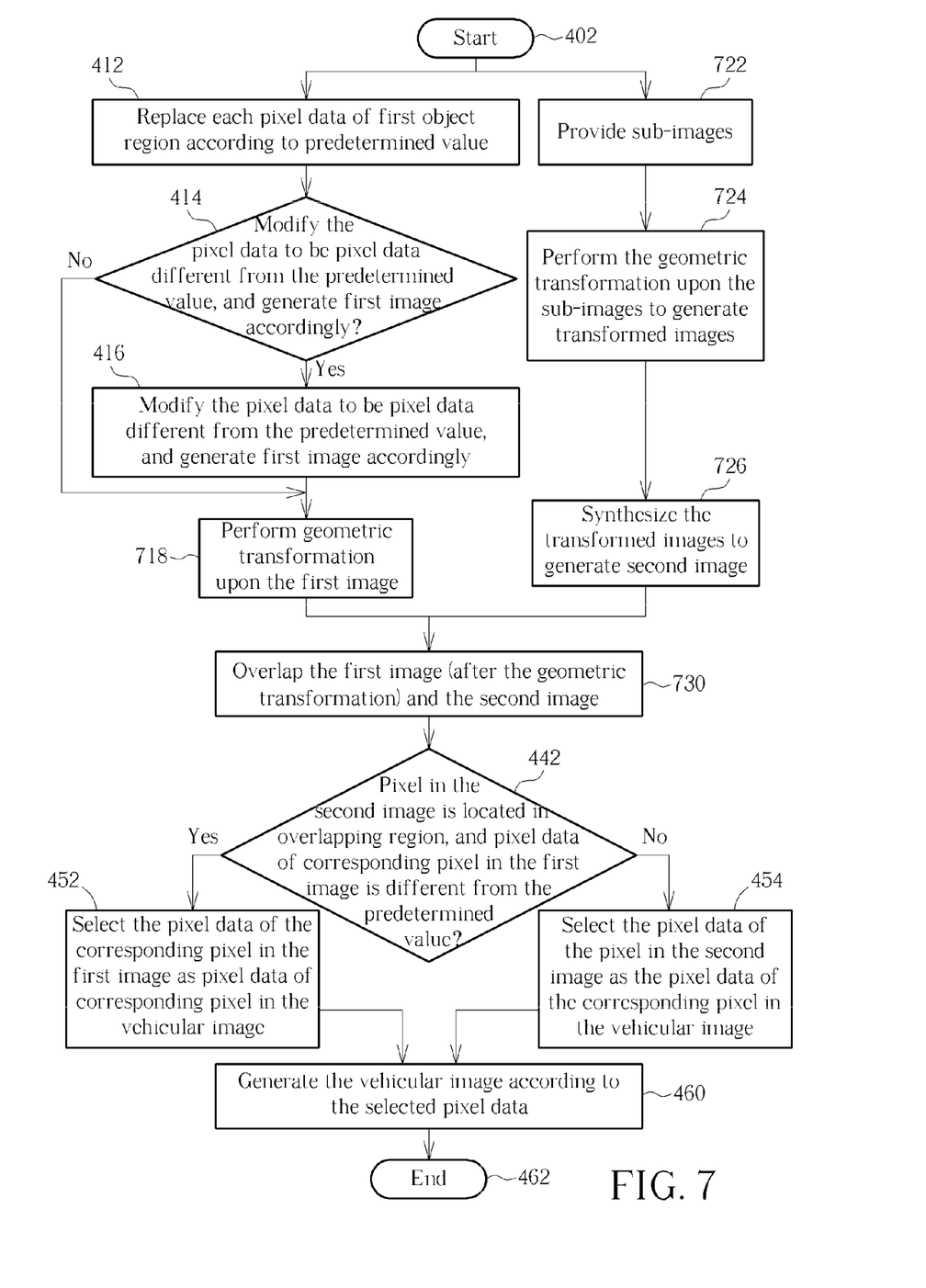
FIG. 7 is a flowchart of an exemplary image processing method for generating a vehicular image according to another embodiment of the present invention.

As shown in FIG. 5 and FIG. 6, not only has the undesired background between the vehicle object and the surroundings been removed from the generated vehicular image IMG_VR1/IMG_VR2, but also a wider driver's field of view and more completed driving information are provided for the driver. Please refer to FIG. 7 for a better understanding of a flow including a geometric transformation. FIG. 7 is a flowchart of an exemplary image processing method for generating a vehicular image according to another embodiment of the present invention. Provided that the result is substantially the same, steps may be executed in the exact order shown in FIG. 7. The image processing method shown in FIG. 7 is based on that shown in FIG. 4, and may be summarized as below.

Step 402: Start.

Step 412: Replace each pixel data of a first object region of an object image according to a predetermined value.

Step 414: Compare pixel data of each pixel in a second object region of the object image with the predetermined value. If at least one pixel data is equal to the predetermined value, go to step 416; otherwise, go to step 430.

Step 416: Modify the pixel data of the second object region which is equal to the predetermined value to be pixel data different from the predetermined value, and generate a first image accordingly.

Step 718: Perform a geometric transformation upon the first image.

Step 722: Provide a plurality of sub-images.

Step 724: Perform the geometric transformation upon the sub-images to generate a plurality of transformed images.

Step 726: Synthesize the transformed images to generate a second image.

Step 730: After the geometric transformation, overlap the first image and the second image.

Step 442: Determine whether each pixel in the second image is located in an overlapping region between the first image and the second image. If the pixel in the second image is located in the overlapping region, determine whether pixel data of a corresponding pixel (at the same position as the pixel in the second image) in the first image is different from the predetermined value. If the pixel in the second image is located in the overlapping region, and the pixel data of the corresponding pixel in the first image is different from the predetermined value, go to step 452; if the pixel of the second image is not located in the overlapping region, or the pixel of the second image is located in the overlapping region while the pixel data of the corresponding pixel in the first image is equal to the predetermined value, go to step 454.

Step 452: Select the pixel data of the corresponding pixel (at the same position as the pixel in the second image) in the first image as pixel data of a corresponding pixel (at the same position as the pixel in the second image) in the vehicular image.

Step 454: Select the pixel data of the pixel in the second image as pixel data of the corresponding pixel (at the same position as the pixel in the second image) in the vehicular image.

Step 460: Generate the vehicular image according to the selected pixel data.

Step 462: End.

As a person skilled in the art can readily understand the operation of each step shown in FIG. 7 after reading the description directed to FIGS. 1-6, further description is omitted here for brevity.

To sum up, the proposed image processing method may generate a vehicular image without undesired background scenes between a vehicle object and the surroundings by pre-processing a vehicle image. The proposed method may beautify the vehicular image and enhance image fidelity thereof, thereby providing a wider driver's field of view and more completed driving information for the driver.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method for generating a vehicular image, comprising:
    providing a first image, wherein the first image has a first specific region, and pixel data of each pixel in the first specific region is converted to a predetermined value;
    providing a second image, and overlapping the first image and the second image to form an overlapping region;
    comparing the predetermined value with pixel data of each pixel in the first image overlapped on the second image to generate a comparison result; and
    determining whether pixel data of each pixel in the overlapping region is pixel data of the first image or pixel data of the second image according to the comparison result, and accordingly generating the vehicular image.

2. The image processing method of claim 1, wherein the first image further comprises a second specific region and each pixel data in the second specific region is not equal to the predetermined value.

3. The image processing method of claim 2, wherein the first specific region is a background scene, and the second specific region is a foreground object.

4. The image processing method of claim 3, wherein the foreground object is a vehicle object.

5. The image processing method of claim 2, wherein the step of providing the first image comprises:
    when the pixel data of a pixel in the second specific region is equal to the predetermined value, modifying the pixel data of the pixel in the second specific region to be pixel data different from the predetermined value.

6. The image processing method of claim 1, wherein the step of determining whether the pixel data of each pixel in the overlapping region is the pixel data of the first image or the pixel data of the second image according to the comparison result comprises:
    if the comparison result indicates that pixel data of a pixel in the first image is equal to the predetermined value, using pixel data of a corresponding pixel in the second image instead of the pixel data of the pixel in the first image as pixel data of a corresponding pixel in the vehicular image; and
    if the comparison result indicates that the pixel data of the pixel in the first image is different from the predetermined value, using the pixel data of the pixel in the first image as the pixel data of the corresponding pixel in the vehicular image.

7. The image processing method of claim 1, further comprising:
    for each pixel beyond the overlapping region:
        using pixel data of a pixel in the second image as pixel data of a corresponding pixel in the vehicular image.

8. The image processing method of claim 1, wherein each pixel data is a luminance value.

9. The image processing method of claim 1, wherein the second image is synthesized by a plurality of sub-images through a geometric transformation.

10. The image processing method of claim 9, wherein the step of overlapping the first image and the second image is performed after the geometric transformation is performed upon the first image.

11. The image processing method of claim 10, wherein the geometric transformation comprises a zoom in operation, a zoom out operation, a rotation operation, a shifting operation, a tilt operation or a viewing angle changing operation.

12. An image processing apparatus for generating a vehicular image, comprising:
- a storage unit, for storing a first image and a second image, wherein the first image has a first specific region, and pixel data of each pixel in the first specific region is converted to a predetermined value; and
- a processing unit, coupled to the storage unit, for overlapping the first image and the second image to form an overlapping region; comparing the predetermined value with pixel data of each pixel in the first image overlapped on the second image to generate a comparison result; and determining whether pixel data of each pixel in the overlapping region is pixel data of the first image or pixel data of the second image according to the comparison result, and accordingly generating the vehicular image.

* * * * *